United States Patent
Kondo et al.

(10) Patent No.: US 12,060,847 B2
(45) Date of Patent: Aug. 13, 2024

(54) FUEL PRESSURE CONTROL SYSTEM

(71) Applicant: DENSO CORPORATION, Kariya (JP)

(72) Inventors: Takahiro Kondo, Kariya (JP); Ryohei Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/305,672

(22) Filed: Apr. 24, 2023

(65) Prior Publication Data

US 2023/0258142 A1    Aug. 17, 2023

Related U.S. Application Data

(63) Continuation of application No. PCT/JP2021/037113, filed on Oct. 7, 2021.

(30) Foreign Application Priority Data

Oct. 26, 2020    (JP) ................. 2020-179135

(51) Int. Cl.
*F02D 41/26*    (2006.01)
*F02D 1/00*    (2006.01)
*F02D 41/22*    (2006.01)
*F02D 41/38*    (2006.01)

(52) U.S. Cl.
CPC ............. *F02D 41/22* (2013.01); *F02D 1/00* (2013.01); *F02D 41/38* (2013.01); *F02D 2041/224* (2013.01); *F02D 2200/101* (2013.01)

(58) Field of Classification Search
CPC ............. F02D 2200/0602; F02D 41/38; F02D 41/3836; F02D 1/00; F02D 2001/007; F02D 41/3863; F02D 41/3809; F02D 19/022; F02D 19/021; F02D 19/023; F02M 63/0225; F02M 63/0003; F02M 63/0005;

(Continued)

(56) References Cited

U.S. PATENT DOCUMENTS 9,279,404 B2 * 3/2016 Aoki ............... F02M 63/0245
2016/0298569 A1 * 10/2016 Bays ............... F02D 41/3836

FOREIGN PATENT DOCUMENTS

| CN | 102200059 B | * | 9/2014 | ......... F02D 41/1401 |
| CN | 103620205 B | * | 1/2016 | ............. F02D 41/30 |
| DE | 102015215688 B4 | * | 10/2017 | ........... F02D 41/123 |

(Continued)

OTHER PUBLICATIONS

DE 102015215688 B4 English translation (Year: 2017).*

*Primary Examiner* — George C Jin
*Assistant Examiner* — Teuta B Holbrook
(74) *Attorney, Agent, or Firm* — Nixon & Vanderhye P.C.

(57) ABSTRACT

A booster pump increases fuel pressure in a high-pressure system of a fuel supply system. A decompression mechanism reduces the fuel pressure. In case of a discharge abnormality of the booster pump which causes rise in the fuel pressure, the fuel pressure control system performs an abnormality handling to cause the decompression mechanism to stop the rise in the fuel pressure. In case of the discharge abnormality, and on determination of a warning-required state, in which the fuel pressure in the high-pressure system possibly exceeds a threshold pressure, a control device causes a warning state, in which the fuel pressure does not exceed the threshold pressure before the rise in the fuel pressure stops, even if the discharge abnormality occurs.

11 Claims, 7 Drawing Sheets

(58) Field of Classification Search
CPC . F02M 63/0007; F02M 63/0008; F02M 63/00
See application file for complete search history.

(56) References Cited

FOREIGN PATENT DOCUMENTS

| | | | | | |
|---|---|---|---|---|---|
| JP | 4114654 | B2 | * | 7/2008 | ......... F02D 41/3863 |
| JP | 2010190147 | A | | 9/2010 | |
| JP | 2010190148 | A | | 9/2010 | |
| JP | 2018003636 | A | * | 1/2018 | |
| JP | 2018145854 | A | * | 9/2018 | |
| JP | 2019157703 | A | * | 9/2019 | |

* cited by examiner

FUEL PRESSURE CONTROL SYSTEM

CROSS REFERENCE TO RELATED APPLICATION

The present application is a continuation application of International Patent Application No. PCT/JP2021/037113 filed on Oct. 7, 2021, which designated the U.S. and claims the benefit of priority from Japanese Patent Application No. 2020-179135 filed on Oct. 26, 2020. The entire disclosures of all of the above applications are incorporated herein by reference.

TECHNICAL FIELD

The present disclosure relates to a fuel pressure control system configured to control a fuel pressure of a fuel supply system that supplies fuel to an injector of an engine.

BACKGROUND

A fuel pressure control system, in some cases, includes a booster pump that increases a fuel pressure in a high-pressure system that is a part of the fuel supply system, a decompression mechanism that reduces the pressure in the high-pressure system, and a control device that controls the booster pump and the decompression mechanism.

SUMMARY

In such a fuel pressure control system, when (a) a discharge abnormality occurs as an abnormality in which a discharge flow amount of the booster pump becomes larger than a normal amount, and (b) the fuel pressure in the high-pressure system starts to rise, the decompression mechanism performs a predetermined abnormality handling, thereby to stop the rise in the fuel pressure. Therefore, the fuel pressure in the high-pressure system rises to some extent during a time lag from a start of the rise in the fuel pressure due to the discharge abnormality to a stop of such rise in the fuel pressure. Therefore, the high-pressure system is required to withstand the increased fuel pressure, which may be designated as a withstand pressure. Therefore, an upper limit of the fuel pressure in the high-pressure system to be used during a normal discharge time when there is no discharge abnormality must be lowered by a margin for such increase in the fuel pressure due to the time lag.

It is an object of the present disclosure to raise an upper limit of the fuel pressure used during a normal discharge time.

A fuel pressure control system according to the present disclosure controls a fuel pressure in a fuel supply system that supplies fuel to an injector of an engine. The fuel pressure control system includes a booster pump that increases the fuel pressure in a high-pressure system by discharging fuel to the high-pressure system that serves as a part of the fuel supply system, a decompression mechanism that reduces the pressure in the high-pressure system, and a control device that controls the booster pump and the decompression mechanism. The fuel pressure control system is, when a discharge abnormality occurs as an abnormality in which a discharge flow amount of the booster pump becomes larger than a normal amount and the fuel pressure in the high-pressure system starts to rise, configured to perform a predetermined abnormality handling by the decompression mechanism, thereby stopping the rise in the fuel pressure.

The control device includes a state determiner for performing a state determination determining whether a warning-required state arises in which, if the discharge abnormality occurs, the fuel pressure in the high-pressure system possibly exceeds a predetermined threshold pressure that is equal to or lower than a withstand pressure of the high-pressure system before the abnormality handling stops the rise in the fuel pressure. On determination of the warning-required state, the control device starts to perform a warning control that causes a warning state which is a state in which, even if the discharge abnormality occurs, the fuel pressure in the high-pressure system does not exceed the threshold pressure before the abnormality handling stops the rise in the fuel pressure.

According to the present disclosure, the state determination is performed to determine whether it is a warning-required state in which the fuel pressure in the high-pressure system possibly exceeds the predetermined threshold pressure that is lower than the withstand pressure of the high-pressure system, if the discharge abnormality occurs, and, on determination of the warning-required state, the warning control is started. By performing the warning control, the warning state is caused in which the fuel pressure in the high-pressure system is prevented from exceeding the predetermined threshold pressure equal to or lower than the withstand pressure of the high-pressure system, even if the discharge abnormality occurs. Therefore, the upper limit of the fuel pressure in the high-pressure system, to which the fuel pressure possibly reaches due to the discharge abnormality, can be reduced to a pressure that is equal to or lower than the withstand pressure of the high-pressure system.

In such manner, since the warning control is performed in the warning-required state, it is not necessary, during a time of the normal state which is not the warning-required state, to consider the occurrence of discharge abnormality in the warning-required state. In such manner, the upper limit of the fuel pressure to be used in the normal state during a normal discharge time can be set to a higher value.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
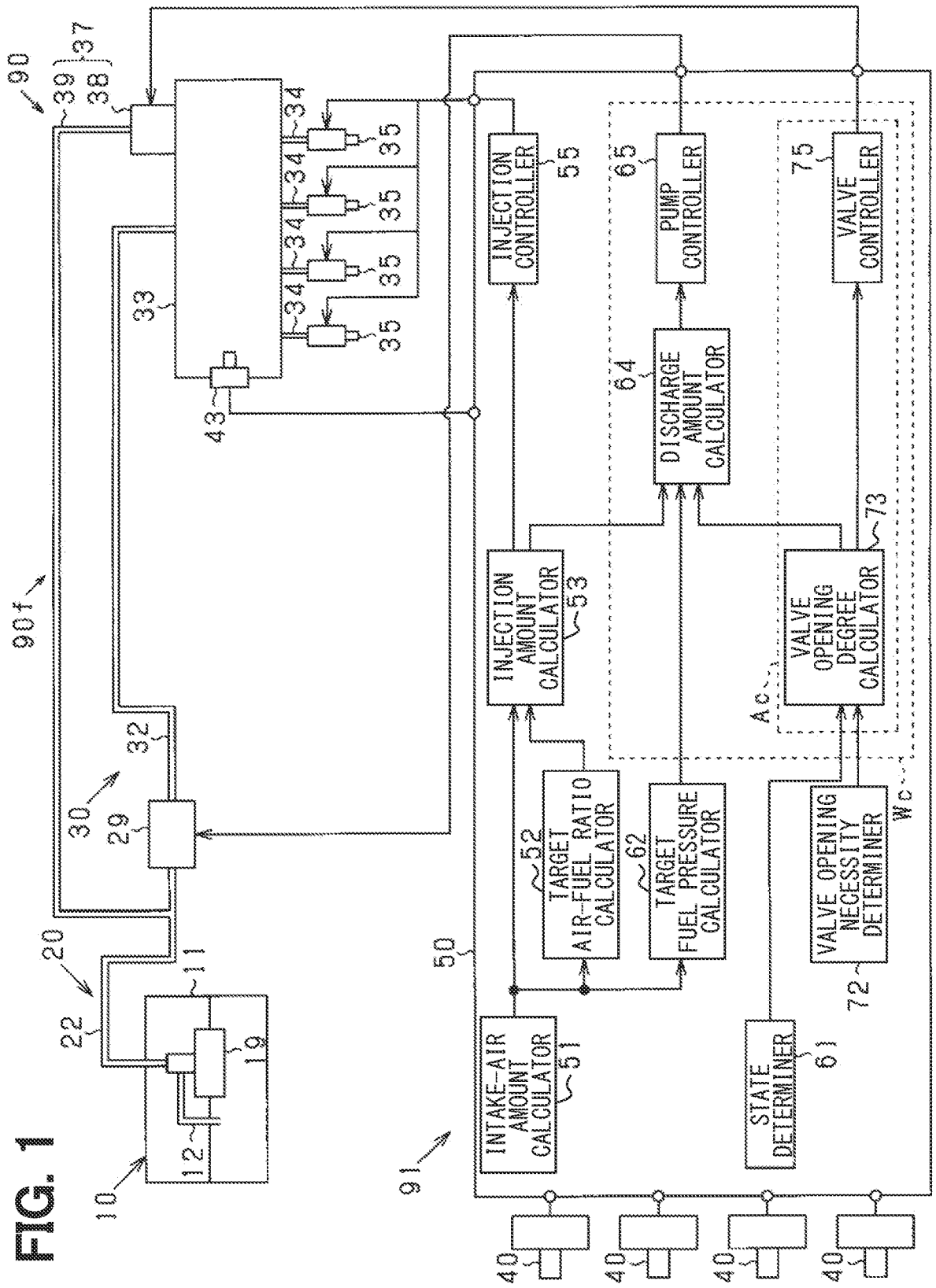
FIG. 1 is a schematic diagram showing a fuel pressure control system and its surroundings according to a first embodiment.

Hereinafter, examples of the present disclosure will be described.

According to an example of the present disclosure, a fuel pressure control system includes a booster pump that increases a fuel pressure in a high-pressure system that is a part of the fuel supply system, a decompression mechanism that reduces the pressure in the high-pressure system, and a control device that controls the booster pump and the decompression mechanism.

According to an example of the fuel pressure control system, when (a) a discharge abnormality occurs as an abnormality in which a discharge flow amount of the booster pump becomes larger than a normal amount, and (b) the fuel pressure in the high-pressure system starts to rise, the decompression mechanism performs a predetermined abnormality handling, thereby to stop the rise in the fuel pressure. The fuel pressure in the high-pressure system rises to some extent during a time lag from a start of the rise in the fuel pressure due to the discharge abnormality to a stop of such rise in the fuel pressure. Therefore, the high-pressure system is required to withstand the increased fuel pressure, which may be designated as a withstand pressure. In one example, an upper limit of the fuel pressure in the high-pressure system to be used during a normal discharge time when there is no discharge abnormality needs to be lowered by a margin for such increase in the fuel pressure due to the time lag.

A fuel pressure control system according to an example of the present disclosure controls a fuel pressure in a fuel supply system that supplies fuel to an injector of an engine. The fuel pressure control system includes a booster pump that increases the fuel pressure in a high-pressure system by discharging fuel to the high-pressure system that serves as a part of the fuel supply system, a decompression mechanism that reduces the pressure in the high-pressure system, and a control device that controls the booster pump and the decompression mechanism. The fuel pressure control system is, when a discharge abnormality occurs as an abnormality in which a discharge flow amount of the booster pump becomes larger than a normal amount and the fuel pressure in the high-pressure system starts to rise, configured to perform a predetermined abnormality handling by the decompression mechanism, thereby stopping the rise in the fuel pressure.

The control device includes a state determiner for performing a state determination determining whether a warning-required state arises in which, if the discharge abnormality occurs, the fuel pressure in the high-pressure system possibly exceeds a predetermined threshold pressure that is equal to or lower than a withstand pressure of the high-pressure system before the abnormality handling stops the rise in the fuel pressure. On determination of the warning-required state, the control device starts to perform a warning control that causes a warning state which is a state in which, even if the discharge abnormality occurs, the fuel pressure in the high-pressure system does not exceed the threshold pressure before the abnormality handling stops the rise in the fuel pressure.

According to the example of the present disclosure, the state determination is performed to determine whether it is a warning-required state in which the fuel pressure in the high-pressure system possibly exceeds the predetermined threshold pressure that is lower than the withstand pressure of the high-pressure system, if the discharge abnormality occurs, and, on determination of the warning-required state, the warning control is started. By performing the warning control, the warning state is caused in which the fuel pressure in the high-pressure system is prevented from exceeding the predetermined threshold pressure equal to or lower than the withstand pressure of the high-pressure system, even if the discharge abnormality occurs. Therefore, the upper limit of the fuel pressure in the high-pressure system, to which the fuel pressure possibly reaches due to the discharge abnormality, can be reduced to a pressure that is equal to or lower than the withstand pressure of the high-pressure system.

In such manner, since the warning control is performed in the warning-required state, it is not necessary, during a time of the normal state which is not the warning-required state, to consider the occurrence of discharge abnormality in the warning-required state. In such manner, the upper limit of the fuel pressure to be used in the normal state during a normal discharge time can be set to a higher value.

Embodiments of the present disclosure will now be described with reference to the drawings. However, it is noted that, the present disclosure is not limited to the embodiments and may be implemented with appropriate modification without departing from the gist of the disclosure.

First Embodiment

First, the gist of the present embodiment is described. A fuel pressure control system 91 shown in FIG. 1 is a system for controlling a fuel pressure P of a fuel supply system 90$f$ that supplies fuel to an injector 35 of an engine 90, and has a booster pump 29, a decompression mechanism 37, and a control device 50.

The booster pump 29 is driven by the engine 90. The booster pump 29 discharges fuel to a high-pressure system 30 to increase the fuel pressure P of the high-pressure system 30. On the other hand, the decompression mechanism 37 is a mechanism for decompressing the high-pressure system 30. The control device 50 controls the booster pump 29 and the decompression mechanism 37. Specifically, the control device 50 includes a target fuel pressure calculator 62 that calculates a target fuel pressure Pt, and controls the fuel pressure P of the high-pressure system 30 at a fuel injection start timing of the injector 35 to be brought closer to the calculated target fuel pressure Pt.

Then, when a discharge abnormality A occurs as an abnormality in which a discharge flow amount Q of the booster pump 29 becomes larger than that in a normal state and the fuel pressure in the high-pressure system 30 starts to rise, the control device 50 is configured to stop the rise in the fuel pressure in the high-pressure system 30, by causing the decompression mechanism 37 to perform a predetermined abnormality handling Ac.

Then, the control device 50 includes a state determiner 61 that determines whether or not a predetermined warning-required state Wq arises. The warning-required state Wq is a state of a comparative example indicated by a broken line in (b) in FIG. 5, that is, a state in which the fuel pressure P of the high-pressure system 30 may possibly exceed a predetermined threshold pressure Px, which is equal to or lower than a withstand pressure of the high-pressure system 30, before the rise in the fuel pressure in the high-pressure system 30 is stopped by the abnormality handling Ac.

Figure 2:
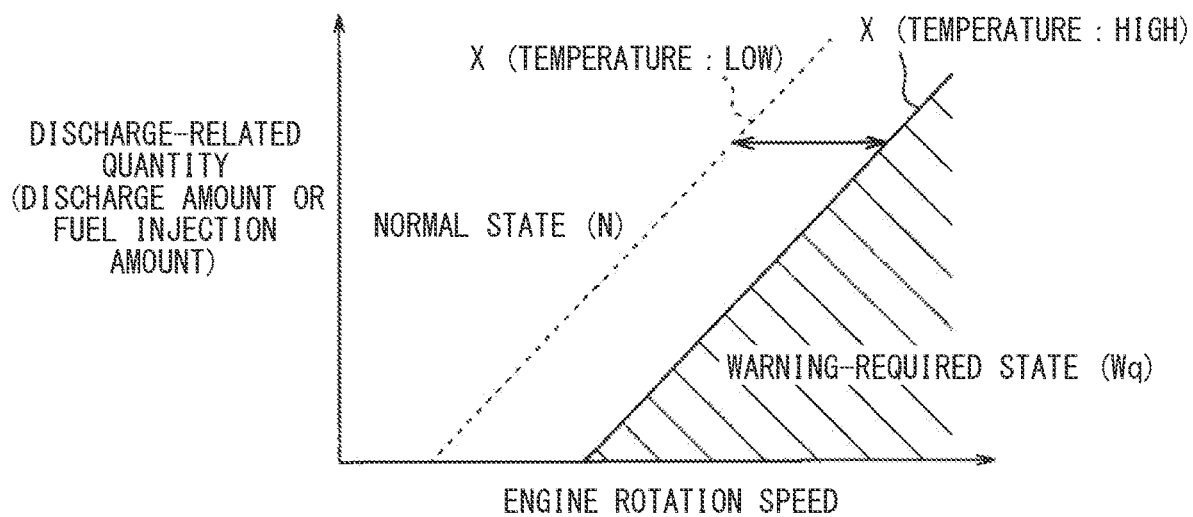
FIG. 2 is a diagram showing criteria for state determination.

As shown in FIG. 2, a state determination regarding the above is performed based on three parameters, i.e., a rotation speed of the engine 90, a predetermined discharge-related quantity, and temperature of a predetermined part. The discharge-related quantity is a discharge amount of the booster pump 29 per combustion cycle or a fuel injection amount of the injector 35 per combustion cycle. Normally, the discharge amount and the fuel injection amount per combustion cycle are approximately the same. The temperature of the predetermined part is the temperature of the fuel, the temperature of a cooling water of the engine 90, the temperature of a lubricating oil of the engine 90, the temperature of outside air, and the like.

In the state determination, as shown by a difference along the horizontal axis direction of FIG. 2, when the rotation speed of the engine 90 is fast (right side) rather than slow (left side), it is more likely to make a determination of the warning-required state Wq since a vertical range of the warning-required state Wq is widened on the right side of the horizontal axis.

Further, in the state determination, as shown by a difference along the vertical axis direction of FIG. 2, when the discharge-related state is small (lower side) rather than large (high side), it is more likely to make a determination of the warning-required state Wq since a horizontal range of the warning-required state Wq is widened.

Furthermore, in such state determination, as shown by a difference between a solid boundary line X and a broken boundary line X in FIG. 2, when the temperature of the predetermined part is low (the broken boundary line X on the left) rather than high (the solid boundary line X), it is more likely to make a determination of the warning-required state Wq since a region of the warning-required state Wq is widened.

Then, the control device 50 shown in FIG. 1 starts a warning control Wc on condition that the state determiner 61 determines that it is in the warning-required state Wq in a state of the normal control Nc in which the warning control Wc is not being performed. The warning control Wc is a control that causes a warning state W which is a state in which the fuel pressure P in the high-pressure system is prevented from exceeding the threshold pressure before the rise in the fuel pressure stops by the abnormality handling Wc even if the discharge abnormality A occurs, as shown by the solid line in (b) in FIG. 5.

Figure 4:
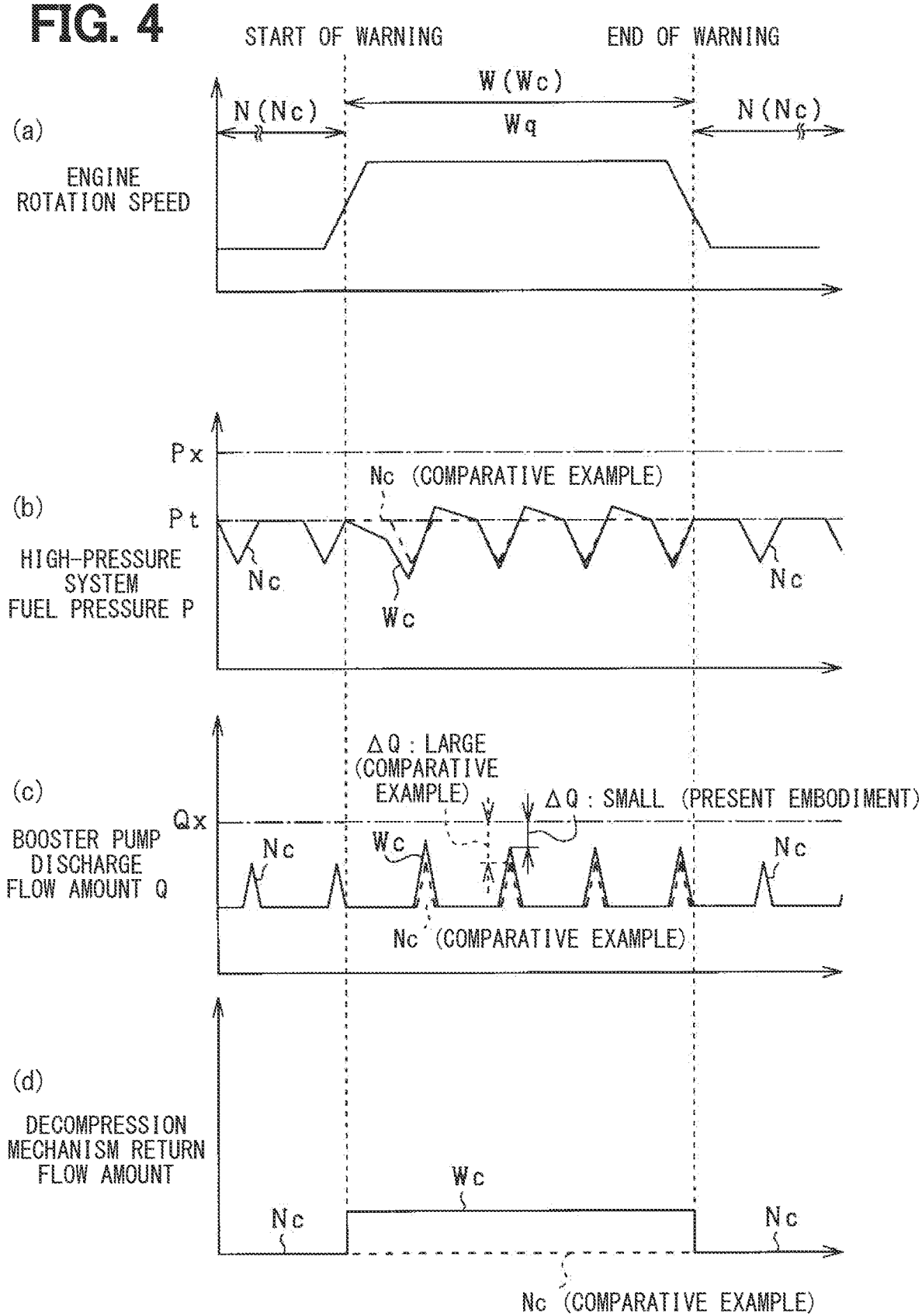
FIG. 4 is a graph showing a transition of each value when an warning control is performed and then canceled.

Specifically, in the warning control Wc, as indicated by a one-dot chain line in (b) in FIG. 4, the decompression by the decompression mechanism 37 shown in (d) in FIG. 4 is performed while the same target fuel pressure Pt as the normal control Nc that does not perform the warning control Wc is maintained unchanged. In such manner, the discharge flow amount Q of the booster pump 29 necessarily rises as shown in (c) in FIG. 4 to offset the fall in the fuel pressure in the high-pressure system 30 due to such decompression.

In such manner, while the fuel pressure P of the high-pressure system 30 is maintained unchanged at the same level as when the normal control Nc is performed as shown in (b) in FIG. 4, an increasable flow amount ΔQ decreases, as shown in (c) in FIG. 4. The increasable flow amount ΔQ is a difference between the discharge flow amount Q of the booster pump 29 and a maximum discharge flow amount Qx of the booster pump 29. In such manner, even if the warning state W indicated by the solid line in (b) in FIG. 5 occurs, which is the discharge abnormality A of the booster pump 29, a state is caused in which the fuel pressure in the high-pressure system 30 does not exceed the threshold pressure Px.

Next, the details of the present embodiment are described by supplementing the main points of the present embodiment described above.

FIG. 1 is a schematic diagram showing the fuel pressure control system 91 and its peripheral components according to the present embodiment. The fuel supply system 90f includes a first low-pressure system 10 and a second low-pressure system 20 in addition to the high-pressure system 30 described above. A feed pump 19 for supplying the fuel of the first low-pressure system 10 to the second low-pressure system 20 is installed at a position between the first low-pressure system 10 and the second low-pressure system 20, and the above-described booster pump 29 for boosting the pressure of the fuel in the second low-pressure system 20 and for supplying it to the high-pressure system 30 is installed at a position between the second low-pressure system 20 and the high-pressure system 30.

The first low-pressure system 10 includes a fuel tank 11 for storing the fuel and a first pipe 12 for drawing up the fuel in the fuel tank 11 to the feed pump 19. The second low-pressure system 20 includes a second pipe 22 connecting the feed pump 19 and the booster pump 29 to each other.

The high-pressure system 30 includes a third pipe 32, a pressure accumulation chamber 33, a fourth pipe 34 and an injector 35. The third pipe 32 connects the booster pump 29 and the pressure accumulation chamber 33 to each other. The fourth pipe 34 connects the pressure accumulation chamber 33 and the injector 35 to each other.

The decompression mechanism 37 includes a return pipe 39 that connects the pressure accumulation chamber 33 and the second pipe 22 to each other, and a pressure reducing valve 38 that opens and closes the return pipe 39. The pressure reducing valve 38 is provided, for example, at a connection portion of the pressure accumulation chamber 33 with the return pipe 39, the return pipe 39, or the like. The pressure reducing valve 38 may be, for example, a solenoid valve or a butterfly valve.

When the pressure reducing valve 38 is a solenoid valve, it is opened by drawing a valve body (not shown) by an electromagnetic solenoid (not shown) when energized, and closed by canceling the drawing when the energization is stopped. Further, when the pressure reducing valve 38 is a butterfly valve, the valve opening amount is adjusted by adjusting the rotation of a disk (not shown) provided in the return pipe 39 or the like.

Further, a fuel pressure sensor 43 for detecting the fuel pressure P in the pressure accumulation chamber 33 and various other sensors 40 are installed in the engine 90. Examples of the various sensors 40 include, for example, a crank angle sensor, a flow sensor (i.e., an airflow meter), various pressure sensors, various temperature sensors, an air-fuel ratio sensor, an accelerator opening sensor, and the like.

More specifically, the various pressure sensors include an intake-air pressure sensor that detects an intake-air pressure, an exhaust-gas pressure sensor that detects an exhaust-gas pressure, an internal pressure sensor that detects a pressure in a combustion chamber, a fuel pressure sensor that detects a fuel pressure of the second low-pressure system and the like. The various temperature sensors include a water temperature sensor that detects the temperature of cooling water, a fuel temperature sensor that detects the temperature of the fuel, an oil temperature sensor that detects the temperature of a lubricating oil, an intake-air temperature that detects the temperature of intake-air, an exhaust-gas temperature sensor that detects the temperature of the exhausted gas, an outside-air temperature sensor that detects the temperature of an outside air, and the like.

The control device 50 controls the injector 35, the booster pump 29, the pressure reducing valve 38, and the like based on information input from these sensors 40, 43.

The control device 50 includes an intake-air amount calculator 51, a target air-fuel ratio calculator 52, an injection amount calculator 53, and an injection controller 55 as parts for controlling the injector 35. The intake-air amount calculator 51 calculates an intake-air amount based on the intake pressure, the rotation speed of the engine 90, and the like. The target air-fuel ratio calculator 52 calculates a target air-fuel ratio based on the calculated intake-air amount, the rotation speed of the engine 90, an accelerator opening, and the like. The injection amount calculator 53 calculates a target fuel injection amount per combustion cycle based on the calculated intake-air amount, the calculated target air-fuel ratio, and the like. The injection controller 55 controls fuel injection by the injector 35 based on the calculated target fuel injection amount and the like.

The control device 50 includes a target fuel pressure calculator 62, a discharge amount calculator 64, and a pump controller 65 as parts for controlling the booster pump 29. The target fuel pressure calculator 62 calculates the target fuel pressure Pt based on the accelerator opening, the intake-air amount, the rotation speed of the engine 90, and the like. Based on the calculated target fuel pressure Pt, the current fuel pressure P, the rotation speed of the engine 90, and the like, the discharge amount calculator 64 calculates a target discharge amount of the booster pump 29 per combustion cycle. The pump controller 65 controls the booster pump 29 based on the calculated target discharge amount.

The control device 50 includes a valve-opening necessity determiner 72, a valve opening degree calculator 73, and a valve controller 75 as parts for controlling the pressure reducing valve 38. The valve-opening necessity determiner 72 determines whether the valve opening is necessary or not. Specifically, the valve-opening necessity determiner 72 determines that a valve opening is necessary when, for example, it is determined that the discharge abnormality A described above is occurring. The determination as to whether or not the discharge abnormality A is occurring can be made based on, for example, a rise speed of the fuel pressure P in the high-pressure system 30, a state of the booster pump 29, and the like.

Further, for example, the valve-opening necessity determiner 72 determines, in a situation of when a vehicle in which the valve-opening necessity determiner 72 itself is mounted is parked, that the valve opening is necessary because the fuel pressure P of the high-pressure system 30 needs to be lowered in such a situation. Further, for example, when it is assumed as a predetermined situation that the fuel pressure P does not easily lower to the target fuel pressure Pt only by fuel injection from the injector 35 due to the fuel pressure P of the high-pressure system 30 being considerably higher than the target fuel pressure Pt, the valve-opening necessity determiner 72 determines that the valve opening is necessary.

Then, (a) when the valve-opening necessity determiner 72 determines that the valve needs to be opened, or (b) when the above-described state determiner 61 determines that the warning-required state Wq is in effect, the valve-opening degree calculator 73 calculates the target valve-opening degree based on parameters such as the current fuel pressure P of the high-pressure system 30, the rotation speed of the engine 90 and the like. Such a calculation may be performed using a map indicating a relationship between the parameters and the target valve opening degree, or may be performed using a mathematical expression indicating such relationship.

The target valve opening degree may be a target valve opening duty or a target valve opening amount. Specifically, for example, when the pressure reducing valve 38 is controlled to be put in two states of open or close such as a solenoid valve or the like, the valve opening degree calculator 73 calculates the valve opening degree as a target valve opening duty of time, which is calculated as a percentage of time per unit time during which the pressure reducing valve 38 should be opened. Further, for example, when the pressure reducing valve 38 is a butterfly valve or the like whose valve opening amount is adjustable, the valve opening degree calculator 73 calculates the target valve opening amount as an amount by which the pressure reducing valve 38 should be opened serving as the target valve opening degree.

Then, the valve controller 75 controls the pressure reducing valve 38 based on the target valve opening degree calculated by the valve opening degree calculator 73.

Next, the warning control Wc is explained. The warning control Wc is performed by the valve opening degree calculator 73, the valve controller 75, the discharge amount calculator 64, and the pump controller 65 when the state determiner 61 determines that it is in the warning-required state Wq. On the other hand, the target fuel pressure calculator 62, which is not involved in performing the warning control Wc, calculates the same target fuel pressure Pt as in the case of the normal control Nc in which the warning control Wc is not performed even when the state determiner 61 determines that it is in the warning-required state Wq.

Specifically, when the state determiner 61 determines that it is in the warning-required state Wq, the valve opening degree calculator 73 calculates the target valve opening degree required to perform the warning control Wc. In such manner, in order to maintain the same fuel pressure P as in the case of the normal control Nc in which the warning control Wc is not performed, the discharge amount calculator 64 necessarily calculates the target discharge amount of the booster pump 29 to be larger than that in the case of the normal control Nc.

As described above, in the warning control Wc, the valve controller 75 opens the pressure reducing valve 38 and the pump controller 65 raises the discharge amount of the booster pump 29.

Next, the abnormality handling Ac is described. The abnormality handling Ac is performed by the valve opening degree calculator 73 and the valve controller 75 when the valve opening necessity determiner 72 determines that the discharge abnormality A is occurring. Specifically, when the valve-opening necessity determiner 72 has determined that a discharge abnormality A is occurring, the valve-opening degree calculator 73 calculates a valve-opening degree required for the abnormality handling Ac as the target valve-opening degree. The valve opening degree calculator 73 opens the pressure reducing valve 38 based on the calculated target valve opening degree. In such manner, the rise in the fuel pressure in the high-pressure system 30 stops, and the fuel pressure P then lowers to the target fuel pressure Pt.

FIG. 2 is a graph showing an example of criteria for a state determination by the state determiner 61, that is, criteria for determining whether or not a situation is in the warning-required state Wq. The horizontal axis of this graph indicates the rotation speed of the engine 90, and the vertical axis indicates the discharge-related quantity, that is, the discharge amount of the booster pump 29 or the fuel injection amount of the injector 35 per combustion cycle. As shown in the graph, the higher the rotation speed of the engine 90, that is, the more rightward in the horizontal axis direction, the more likely it is determined to be in the warning-required state Wq, and, the smaller the discharge-related quantity, that is, the more downward in the vertical axis direction, the more likely it is determined to be in the warning-required state Wq.

Further, the boundary line X for determining whether or not it is in the warning-required state Wq shifts depending on the temperature of a predetermined part such as fuel, cooling water, lubricating oil, and/or outside air. That is, the lower the temperature of the predetermined part, the more the boundary line X shifts to the left, and the higher the temperature of the predetermined part, the more the boundary line X shifts to the right. Therefore, the lower the temperature of the predetermined part, the more likely it is determined to be in the warning-required state Wq. Note that the temperature of the predetermined part mentioned here is preferably the temperature of the fuel, or more specifically, the temperature of the fuel in the high-pressure system 30 in terms of facilitating more accurate state determination.

Figure 3:
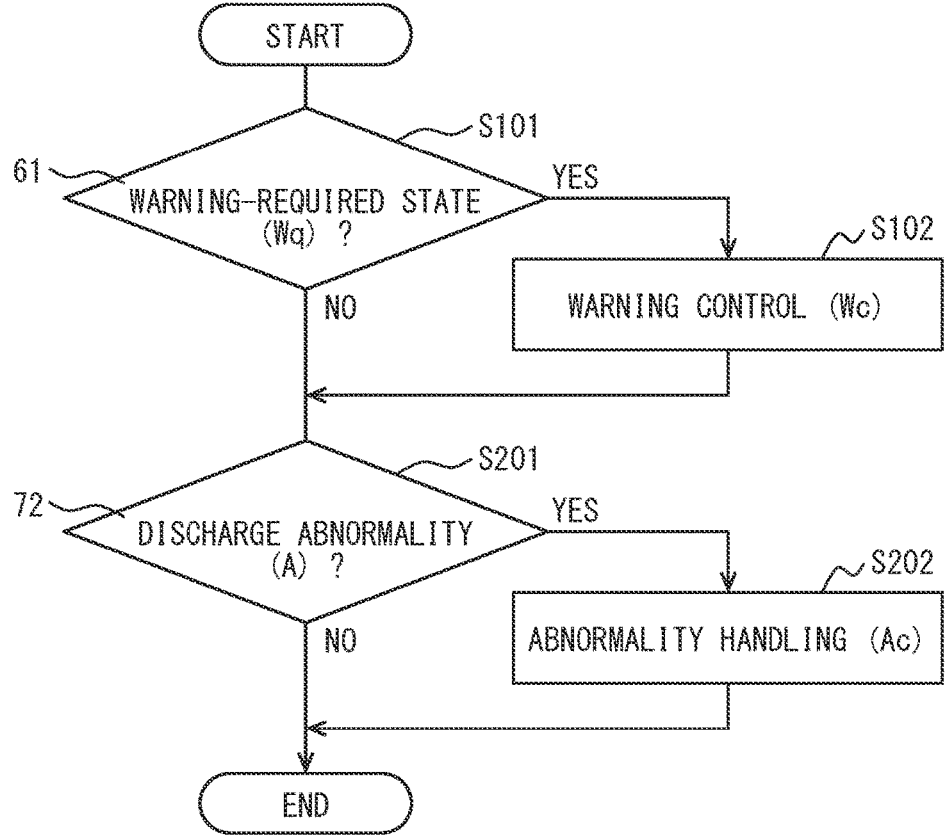
FIG. 3 is a flowchart showing control by a control device.

FIG. 3 is a flowchart showing a control by the control device 50. First, the state determiner 61 determines whether or not it is in the warning-required state Wq (S101). When it is determined in S101 that it is in the warning-required state Wq (S101: YES), the warning control Wc is performed (S102), and the process proceeds to S201. That is, when the warning control Wc has not yet been performed, the warning control Wc is started and the process proceeds to S201. On the other hand, when the warning control Wc is already being performed, the process proceeds to S201 while continuing the warning control Wc.

On the other hand, in S101 of FIG. 3, when it is determined that it is not in the warning-required state Wq (S101: NO), the process proceeds to the next step S201 without performing the warning control Wc. That is, when it is in the state of the normal control Nc in which the warning control Wc is not being performed, the process proceeds to the next step S201 while maintaining the normal control Nc. On the other hand, when the warning control Wc has already been performed, the warning control Wc ends and the normal control Nc is resumed before proceeding to the next step S201.

In S201, the valve-open necessity determiner 72 determines whether or not the discharge abnormality A is occurring. When it is determined that the discharge abnormality A is occurring (S201: YES), the abnormality handling Ac is performed (S202), and the flow ends. That is, when the abnormality handling Ac has not yet been performed, the abnormality handling Ac is started and the flow ends. On the other hand, when the abnormality handling Ac is already being performed, the flow ends while maintaining the abnormality handling Ac.

On the other hand, in S201 of FIG. 3, when it is determined that no discharge abnormality A is occurring (S201: NO), the flow ends without performing the abnormality handling Ac. That is, when the abnormality handling Ac has not yet been performed, the flow ends while maintaining such state. On the other hand, when the abnormality handling Ac has already been performed, the abnormality handling Ac is ended, and the flow ends.

Further, when the flow ends, the process returns to START and repeats the same flow.

(a) to (d) in FIG. 4 show graphs showing the transition of various values in a situation where the normal state N shifts to the warning-required state Wq, thereafter shifts back from the warning-required state Wq to the normal state N without an occurrence of the discharge abnormality A. Note that the broken lines shown in (b) to (d) in FIG. 4 show a comparative example in which the normal control Nc is maintained even in the warning-required state Wq.

Though the fuel pressure P of the high-pressure system 30 lowers when the fuel is injected by the injector 35 as shown in the first half of a V-shaped transition shown in (b) in FIG. 4, the fuel pressure P then recovers when the booster pump 29 discharges the fuel, as shown in the second half of the V-shaped transition. Therefore, a root portion of the first half of the V-shaped transition is a fuel injection start timing of the injector 35. The control device 50 performs a control to bring the fuel pressure P of the high-pressure system 30 at this fuel injection start timing toward the target fuel pressure Pt in both of the normal control Nc and the warning control Wc.

As shown in (a) in FIG. 4, for example, when the rotation speed of the engine 90 rises, the normal state N shifts to the warning-required state Wq, and the normal control Nc shifts to the warning control Wc. Thereby, as shown in (d) in FIG. 4, the pressure reducing valve 38 is opened, and a return flow amount by the decompression mechanism 37 rises. At such timing, the target fuel pressure Pt is not changed, as indicated by a one-dot chain line in (b) in FIG. 4. Therefore, as shown in (c) in FIG. 4, the discharge flow amount Q of the booster pump 29 necessarily rises in order to maintain the fuel pressure P of the high-pressure system 30 at the same flow amount as in the normal control Nc. In such manner, the discharge flow amount Q of the booster pump 29 approaches the maximum discharge flow amount Qx, and the increasable flow amount ΔQ lowers.

Thereafter, as shown in (a) in FIG. 4, for example, when the rotation speed of the engine 90 lowers, the warning-required state Wq shifts to the normal state N, and the warning control Wc shifts to the normal control Nc. In such manner, as shown in (d) in FIG. 4, the pressure reducing valve 38 is closed and the return flow amount by the decompression mechanism 37 becomes zero. In such manner, the discharge flow amount Q of the booster pump 29 lowers and returns to the original discharge flow amount Q, as shown in (c) in FIG. 4.

Figure 5:
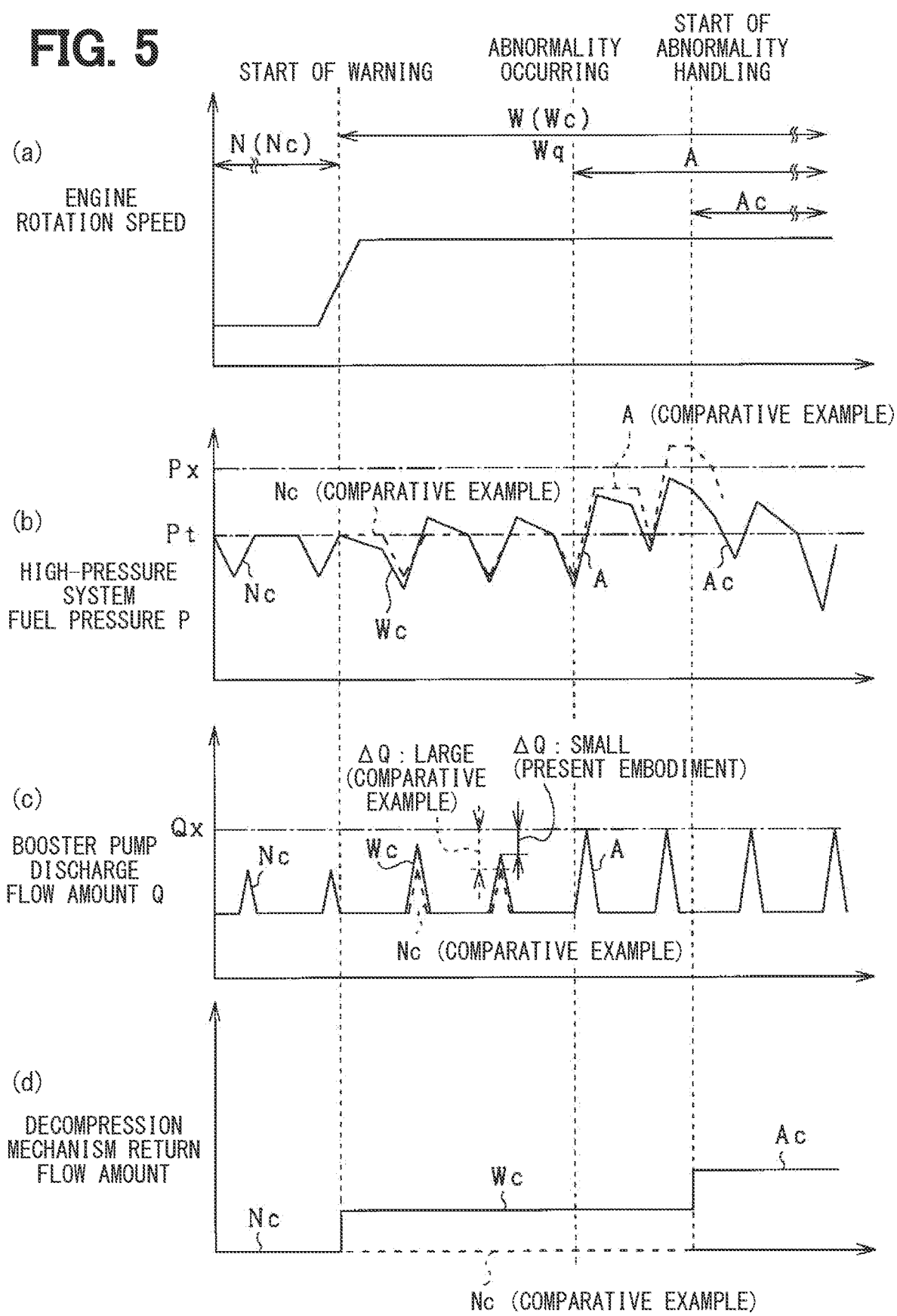
FIG. 5 is a graph showing a transition of each value when the warning control is performed and then an abnormality handling is performed.

Each of (a) to (d) in FIG. 5 is a graph showing the transition of each value when the discharge abnormality A occurs after the normal state N shifts to the warning-required state Wq and the normal control Nc shifts to the warning control Wc. Note that the broken lines shown in (b) to (d) in FIG. 5 show a comparative example in which the normal control Nc is maintained even in the warning-required state Wq.

Similar to the above-described case, when the normal state N shifts to the warning-required state Wq and the normal control Nc shifts to the warning control Wc, the discharge flow amount Q of the booster pump 29 rises as shown in (c) in FIG. 5, and the increasable flow amount ΔQ decreases. Therefore, even if the discharge abnormality A occurs thereafter, an abnormal increase amount of the discharge flow amount Q from the booster pump 29 is suppressed within a range of the lowered increasable flow amount ΔQ. Therefore, as shown in (b) in FIG. 5, the rise in the fuel pressure in the high-pressure system 30 is suppressed as compared with the comparative example.

Thereafter, as shown in (d) in FIG. 5, when the abnormality handling Ac is performed, the valve opening degree of the pressure reducing valve 38 is increased. In such manner, when the return flow amount by the decompression mechanism 37 rises, the fuel pressure P in the high-pressure system 30 begins to decrease before the fuel pressure P in the high-pressure system 30 reaches the threshold pressure Px, as shown in (b) in FIG. 5. As described above, the fuel pressure P of the high-pressure system 30 is suppressed so as not to exceed the threshold pressure Px.

In the following, an effect related to the implementation of the first disclosure at the time of filing is referred to as a first effect, an effect related to the implementation of the second disclosure at the time of filing is referred to as a second effect, and effects related to the implementation of the third to eighth disclosures at the times of filing are respectively referred to as the third to eighth effects.

According to the present embodiment, the following first effect is achievable. In the fuel pressure control system 91 shown in FIG. 1, when the discharge abnormality A occurs, it is determined whether it is in the warning-required state Wq in which the fuel pressure P of the high-pressure system 30 possibly exceeds the predetermined threshold pressure Px, which is equal to or lower than the withstand pressure of the high-pressure system 30, as indicated by the broken line in (b) in FIG. 5. Then, on condition that it is determined to be in the warning-required state Wq, the warning control We is started, as indicated by the solid line in (b) in FIG. 4. The warning control We causes the warning state W in which the fuel pressure P of the high-pressure system 30 is prevented from exceeding the predetermined threshold pressure Px, which is equal to or lower than the withstand pressure of the high-pressure system 30, even if the discharge abnormality A occurs, as shown by the solid line in (b) in FIG. 5. Therefore, the upper limit of the fuel pressure P in the high-pressure system 30 due to the discharge abnormality A is suppressible to the withstand pressure of the high-pressure system 30 or less.

In such manner, since the warning control We is performed in the warning-required state Wq, it is not necessary to consider the occurrence of the discharge abnormality A in the warning-required state Wq when the normal state N is in effect, which is not the warning-required state Wq. In such manner, the upper limit of the fuel pressure P to be used in the normal state N, i.e., in the normal discharge time, can be set to a higher value.

Moreover, the following second effect is also achievable. In the warning control Wc, as shown in (d) in FIG. 4, the pressure is reduced by the decompression mechanism 37, and, as shown in (c) in FIG. 4, the discharge flow amount Q is raised as compared with the comparative example in which the warning control We is not performed. In such manner, while offsetting the fall in the fuel pressure in the high-pressure system 30 due to such decompression by the rise in the fuel pressure in the high-pressure system 30 due to the rise in the discharge flow amount Q as shown in (b) in FIG. 4. In addition, the increasable flow amount $\Delta Q$, which is the difference between the discharge flow amount Q and the maximum discharge flow amount Qx, is lowered as shown in (c) in FIG. 4, compared to the case where the warning control We is not performed.

Therefore, when the discharge abnormality A occurs, the discharge flow amount Q abnormally rises within the range of the lowered increasable flow amount $\Delta Q$, and the rise in the fuel pressure in the high-pressure system 30 is suppressible. In addition, in the warning control Wc, the fall in the fuel pressure in the high-pressure system 30 due to the decompression is offset by the rise in the fuel pressure in the high-pressure system 30 due to the rise in the discharge flow amount Q, the warning control We is performable while maintaining the predetermined fuel pressure P.

Moreover, the following third effect can also be achievable. In the warning control Wc, as shown by the one-dot chain line in (b) in FIG. 4, decompression by the decompression mechanism 37 is performed as shown in (d) in FIG. 4 without changing the target fuel pressure Pt. In such manner, as shown in (c) in FIG. 4, the discharge flow amount Q of the booster pump 29 rises to offset the fall in the fuel pressure P in the high-pressure system 30 due to the decompression. Therefore, the warning state W can be easily caused while maintaining the fuel pressure P of the high-pressure system 30.

In addition, the following sixth effect can also be achievable. Since the booster pump 29 is driven by the engine 90, its maximum discharge flow amount Qx also rises when the rotation speed of the engine 90 is high. Therefore, when the discharge flow amount Q of the booster pump 29 is the same, the higher the rotation speed of the engine 90 is, the larger the increasable flow amount $\Delta Q$ becomes. Further, as the rotation speed of the engine 90 rises, a discharge force becomes stronger and pulsation and the like are more likely to occur, and thus the maximum fuel pressure is likely to rise. In this respect, as shown in FIG. 2, in the state determination, it is likely to determine that the warning-required state Wq is occurring when the rotation speed of the engine 90 is high (toward the right) compared to when it is low (toward the left). By paying attention to the rotation speed of the engine 90 in this manner, it is possible to efficiently determine whether or not it is in the warning-required state Wq.

In addition, the following seventh effect is also achievable. When the rotation speed of the engine 90 is the same, the smaller the discharge amount of the booster pump 29 per combustion cycle is, the larger the increasable flow amount $\Delta Q$ becomes. Further, the discharge amount of the booster pump 29 per combustion cycle and the fuel injection amount of the injector 35 per combustion cycle are approximately the same as each other. In this regard, as shown in FIG. 2, in the state determination, as compared to the case where the discharge amount of the booster pump 29 per combustion cycle or the discharge-related quantity as the fuel injection amount of the injector 35 per combustion cycle is large (toward the upper side), it is likely to make a determination of the warning-required state Wq when the discharge amount or the discharge-related quantity is small. By paying attention to the discharge-related quantity in this manner, it is possible to efficiently determine whether or not the warning-required state Wq is occurring.

In addition, the following eighth effect can also be achievable. When the temperature of the fuel is low, the volume modulus of the fuel becomes high, thereby the fuel pressure P tends to be greatly pulsated and the maximum fuel pressure tends to rise. Further, when the temperature of cooling water, lubricating oil, outside air, and the like is low, the temperature of the fuel also tends to be low. In that respect, as shown in FIG. 2, in the state determination, compared to the case where the temperature of predetermined part such as fuel, cooling water, lubricating oil, and outside air is high (the solid line boundary line X), it is more likely to make a determination of the warning-required state Wq when the temperature is low (the broken boundary line X). By paying attention to the temperature of the predetermined part in this manner, it is possible to efficiently determine whether or not the vehicle is in the warning-required state Wq.

Second Embodiment

The second embodiment of the present disclosure is described as follows. In the following embodiments, the same reference numerals are given to members that are the same as or correspond to those in the previous embodiment. However, the fuel injection system itself is given a different numeral for each embodiment. The present embodiment is described based on the first embodiment, focusing on the configuration different therefrom.

Figure 7:
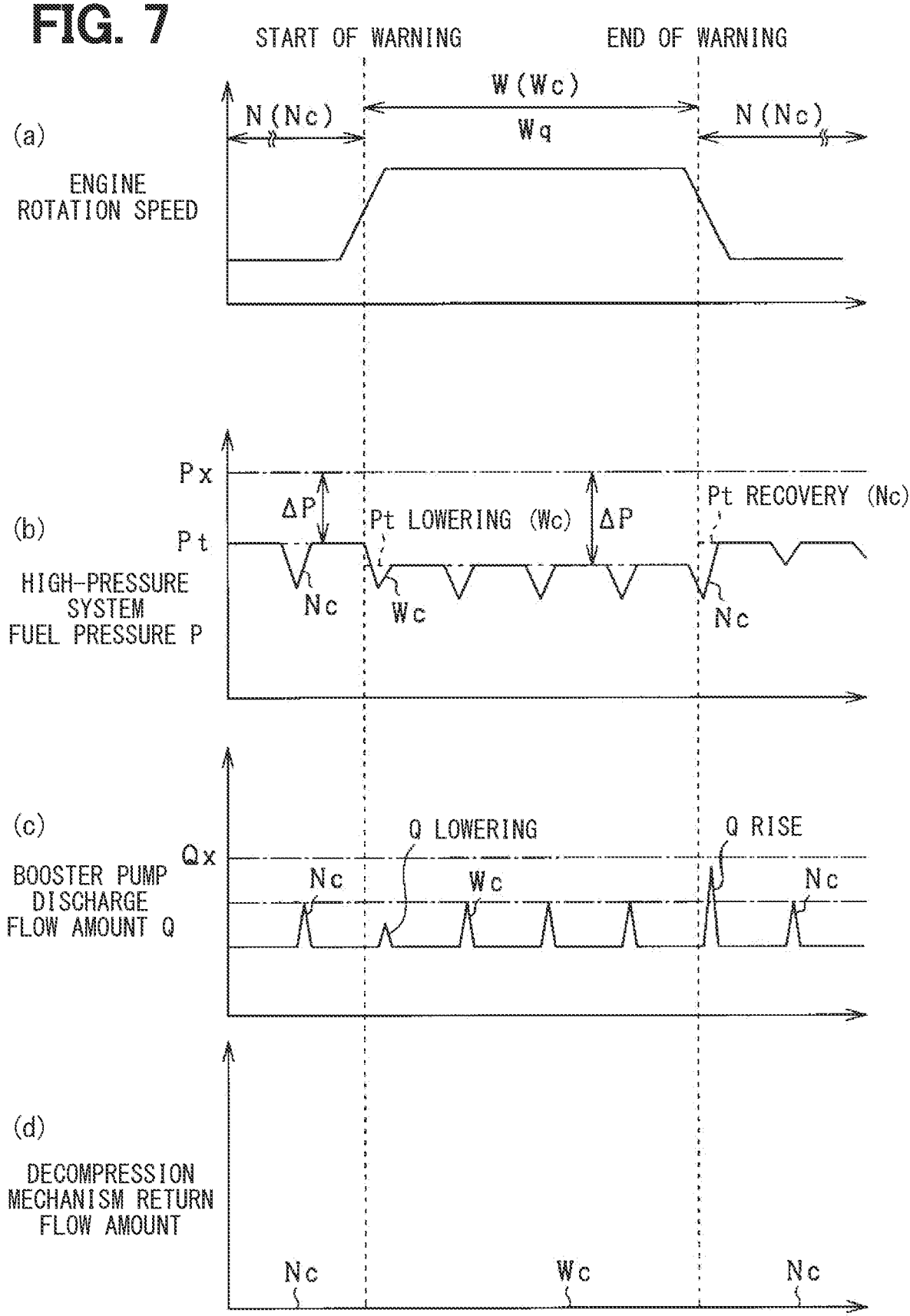
FIG. 7 is a graph showing a transition of each value when the warning control is performed and then canceled.

As shown by the broken line in (b) in FIG. 7, in the warning control Wc of the present embodiment, the target fuel pressure Pt is set to be lower than that in the normal control Nc in which the warning control We is not performed, for lowering the fuel pressure P of the high-pressure system 30. Therefore, a fuel pressure margin ΔP, which is the difference between the current fuel pressure P and the threshold pressure Px of the high-pressure system 30, increases. In such manner, the warning state W described above, that is, the state is caused, in which the fuel pressure P of the high-pressure system 30 does not exceed the threshold pressure Px even if the discharge abnormality A occurs in the booster pump 29. More details are described as follows.

Figure 6:
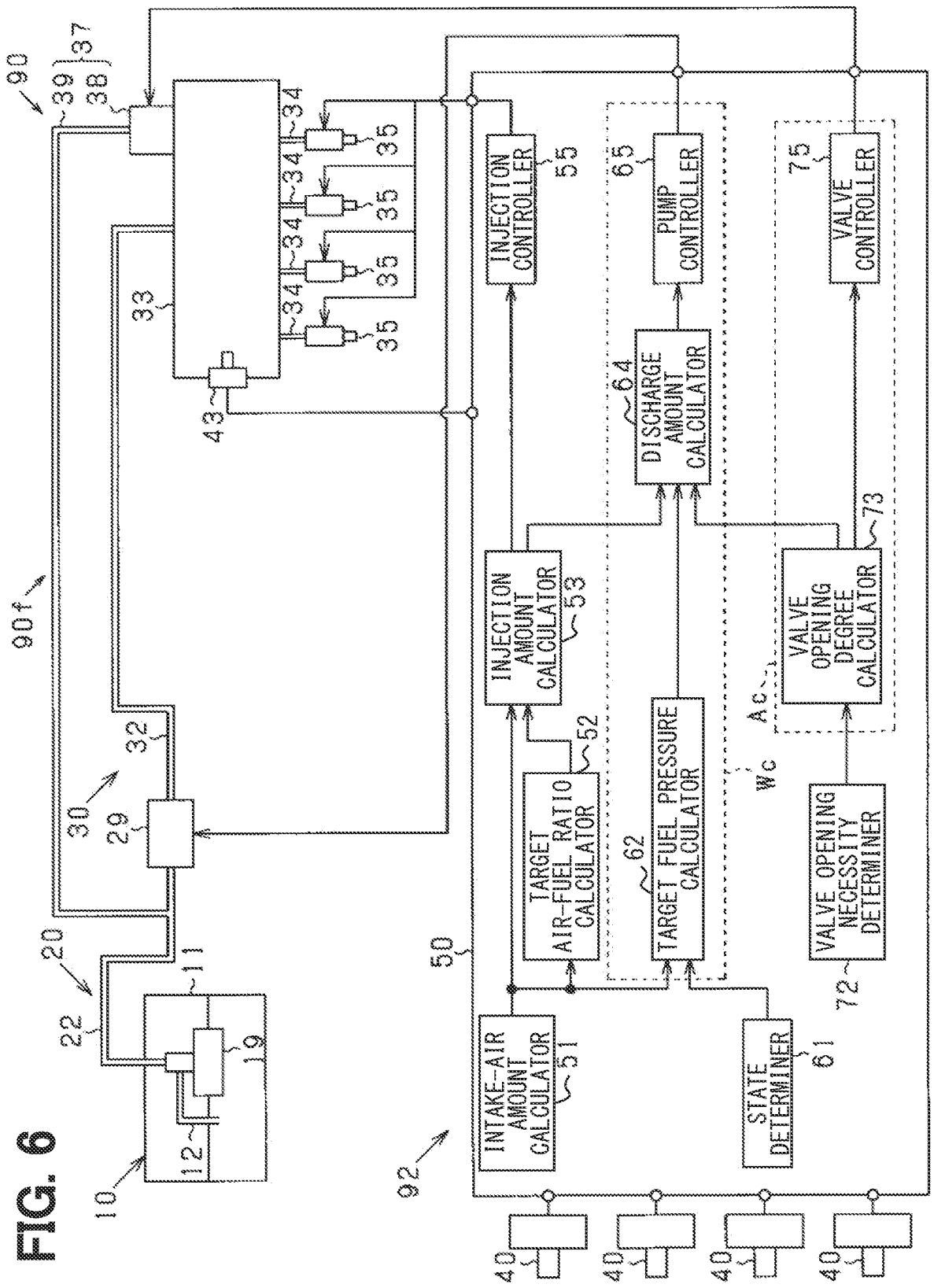
FIG. 6 is a schematic diagram showing the fuel pressure control system and its surroundings according to a second embodiment.

FIG. 6 is a schematic diagram showing a fuel pressure control system 92 of the present embodiment and its peripheral components. In the present embodiment, the target fuel pressure calculator 62 is also involved in performing the warning control Wc. On the other hand, the valve opening degree calculator 73 and the valve controller 75 are not involved in the warning control Wc. Therefore, the warning control We is performed by the target fuel pressure calculator 62, the discharge amount calculator 64, and the pump controller 65. Specifically, when the state determiner 61 determines that the warning-required state Wq is occurring, the target fuel pressure calculator 62 calculates the target fuel pressure Pt for the warning control We which is lower than that for the normal control Nc. In such manner, the discharge amount calculator 64 and the pump controller 65 control the booster pump 29 so that the fuel pressure P is lowered.

Each of (a) to (d) in FIG. 7 shows a graph showing the transition of each parameter in the case where the normal state N shifts to the warning-required state Wq, and the normal control Nc shifts to the warning control Wc, then the warning-required state Wq shifts back to the normal state N without an occurrence of the discharge abnormality A.

As shown in (a) in FIG. 7, for example, when the rotation speed of the engine 90 rises, the normal state N shifts to the warning-required state Wq, and the normal control Nc shifts to the warning control Wc. In such manner, the target fuel pressure Pt indicated by the broken line in (b) in FIG. 7 is lowered. In such manner, as shown in (c) in FIG. 7, the discharge flow amount Q of the booster pump 29 momentarily lowers. In such manner, as shown in (b) in FIG. 7, the fuel pressure P of the high-pressure system 30 is lowered to the target fuel pressure Pt in the warning control Wc. In such manner, the fuel pressure margin ΔP increases.

After that, as shown in (a) in FIG. 7, for example, when the rotation speed of the engine 90 lowers, the warning-required state Wq ends, and the warning control We returns to the normal control Nc. In such manner, the target fuel pressure Pt indicated by the broken line in (b) in FIG. 7 rises to its original state. In such manner, as shown in (c) in FIG. 7, the discharge flow amount Q of the booster pump 29 rises momentarily. In such manner, as shown in (b) in FIG. 7, the fuel pressure P of the high-pressure system 30 rises to the target fuel pressure Pt in the normal control Nc.

Figure 8:
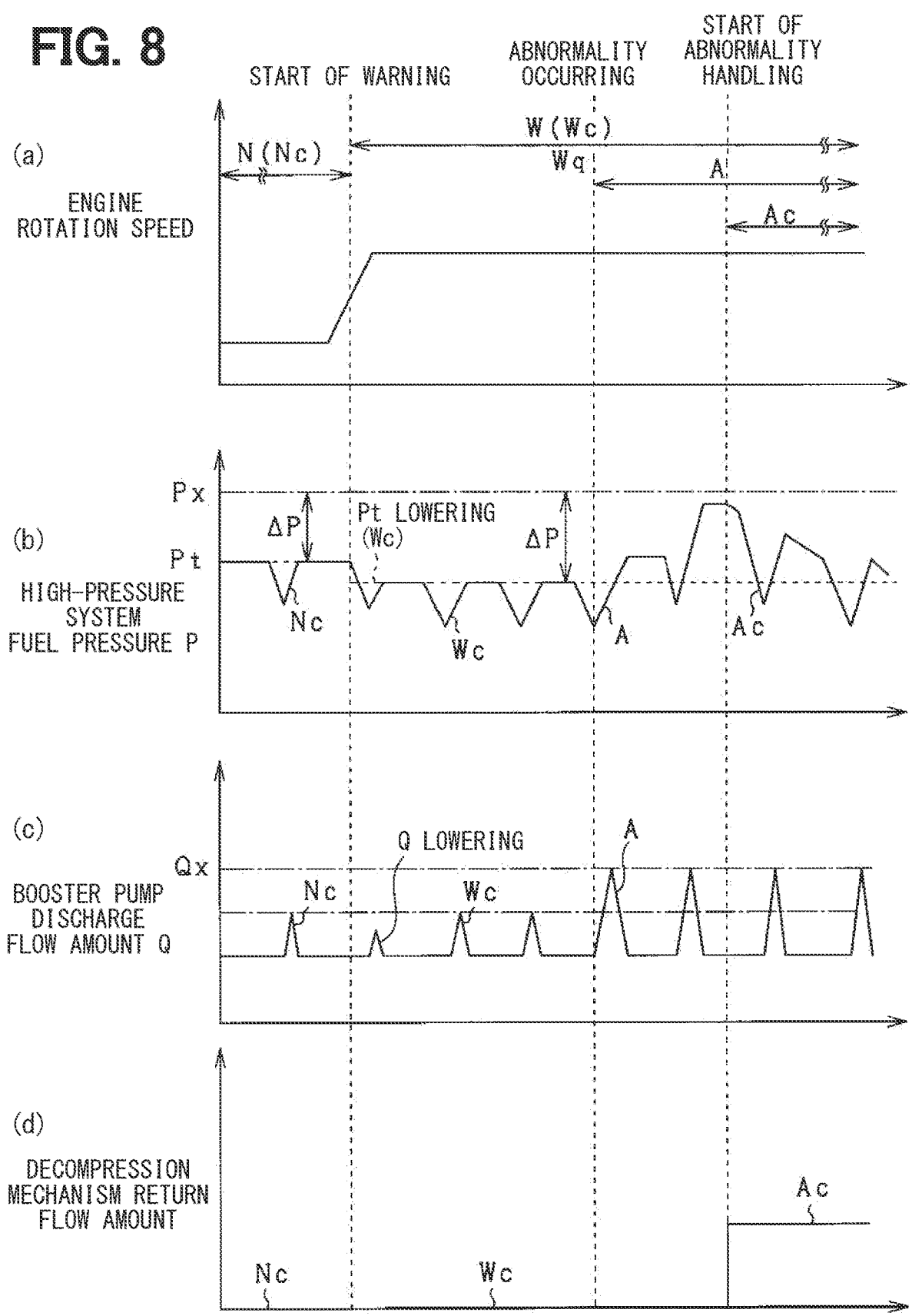
FIG. 8 is a graph showing a transition of each value when the warning control is performed and then the abnormality handling is performed.

Each of (a) to (d) in FIG. 8 is a graph showing the transition of each parameter when the discharge abnormality A occurs after the normal state N shifts to the warning-required state Wq and the normal control Nc shifts to the warning control Wc.

Similar to the above-described case, when the normal state N shifts to the warning-required state Wq and the normal control Nc shifts to the warning control Wc, the target fuel pressure Pt lowers as shown by the broken line in (b) in FIG. 8 and the fuel pressure P of the high-pressure system 30 lowers, thereby the fuel pressure margin ΔP increases. Therefore, even when the fuel pressure P in the high-pressure system 30 starts to rise due to the occurrence of the discharge abnormality A, thereafter, the abnormality handling Ac is performed as shown in (d) in FIG. 8 before the fuel pressure P of the high-pressure system 30 reaches the threshold pressure Px as shown in (b) in FIG. 8, thereby the rise in the fuel pressure in the high-pressure system 30 turns to decrease as shown in (b) in FIG. 8. Thereby, the fuel pressure P of the high-pressure system 30 is suppressed so as not to exceed the threshold pressure Px.

According to the present embodiment, in addition to the first effect and the sixth to eighth effects described above, the following fourth effect can be achievable. As shown in (b) in FIG. 7, in the warning control Wc, the fuel pressure P in the high-pressure system 30 is lowered to increase the fuel pressure margin ΔP, thereby causing the warning state W. Therefore, the warning state W can be caused with a simple configuration.

Moreover, the following fifth effect is also achievable. As shown in (b) in FIG. 7, in the warning control Wc, the target fuel pressure Pt is set low. In such manner, the fuel pressure P in the high-pressure system 30 is lowered. Therefore, the fuel pressure P of the high-pressure system 30 can be lowered with a simple configuration.

Other Embodiments

For example, the above-described embodiments can be modified as follows. For example, as shown in FIG. 1 and the like, in each embodiment, a base end of the return pipe 39 (an end of pipe 39 on a returner side) is connected to the pressure accumulation chamber 33. Instead, the base end of the return pipe 39 may be connected to the third pipe 32, and the pressure reducing valve 38 may be provided at the connecting portion of the return pipe 39 with the third pipe 32 or the like.

Further, a tip of the return pipe 39 (an end on a return destination side) is connected to the second pipe 22. Instead, the tip of the return pipe 39 may be connected to the booster pump 29, to the feed pump 19, to the first pipe 12, or to the fuel tank 11. Further, for example, in the case where a check valve is provided in the third pipe 32 or the connecting portion of the pressure accumulating chamber 33 with the third pipe 32, the tip of the return pipe 39 may be connected to the check valve in the third pipe 32. may be connected to the booster pump 29 side.

Further, for example, the decompression mechanism 37 is composed of the return pipe 39 and the pressure reducing valve 38. Instead, the decompression mechanism 37 may be composed of the injector 35. That is, when the fuel pressure P in the pressure accumulation chamber 33 is lowered, the fuel pressure P may be lowered by injecting extra fuel from the injector 35.

Further, for example, as shown in FIG. 2, in each embodiment, the state determination is performed based on three parameters, namely, the rotation speed of the engine 90, the discharge-related quantity, and the temperature. However, the state determination may be made based only on two parameters or one parameter. Also, a parameter other than these three parameters may be used in addition to or in place of any one of these three parameters to perform the state determination.

Further, for example, as shown in FIG. 3 and the like, in each embodiment, it is determined whether or not a discharge abnormality A is occurring (S201), and based on a condition that it is determined that a discharge abnormality A is occurring (S201: YES), an abnormality handling Ac is performed (S202). Alternatively, when the fuel pressure P of the high-pressure system 30 abnormally rises, the abnormality handling Ac may automatically be performed as a fuel pressure feedback control or the like, without determining whether or not the discharge abnormality A is occurring (S201).

Further, for example, as shown in (b) in FIG. 4 and the like, in the warning control Wc of the first embodiment, the target fuel pressure Pt is maintained unchanged at the same level as in the normal control Nc. However, the target fuel pressure Pt may be slightly changed in such case. In such manner, when the normal control Nc shifts to the warning control Wc, one of (a) the fall in the fuel pressure in the high-pressure system 30 due to the decompression by the decompression mechanism 37 and (b) the rise in the fuel pressure in the high-pressure system 30 due to the rise in the discharge flow amount Q may be made slightly larger than the other, so that only a part of the one is offset by the other.

While the present disclosure has been described with reference to embodiments thereof, it is to be understood that the present disclosure is not limited to such embodiments and structures. The present disclosure encompasses various modifications and variations within the scope of equivalents. In addition, various combinations and forms, and other combinations and forms adding thereto or subtracting therefrom only one element, more than one element, or less than one element may also be included in the scope and concept of the present disclosure.

What is claimed is:

1. A fuel pressure control system configured to control a fuel pressure in a fuel supply system, the fuel supply system configured to supply fuel to an injector of an engine, the fuel pressure control system comprising:
   a booster pump configured to discharge fuel to a high-pressure system, which is a part of the fuel supply system, to increase a fuel pressure in the high-pressure system;
   a decompression mechanism configured to decompress the high-pressure system; and
   a control device configured to control the booster pump and the decompression mechanism, wherein
   the fuel pressure control system is configured to, when a discharge abnormality occurs in which a discharge flow amount of the booster pump becomes larger than a normal amount and the fuel pressure in the high-pressure system starts to rise, cause the decompression mechanism to perform a predetermined abnormality handling to stop the rise in the fuel pressure,
   the control device includes a state determiner configured to perform a state determination to determine whether the fuel pressure in the high-pressure system possibly exceeds a predetermined threshold pressure, which is equal to or lower than a withstand pressure of the high-pressure system, if the discharge abnormality occurs before the abnormality handling stops the rise in the fuel pressure,
   the control device is configured to start, on determination of the fuel pressure that possibly exceeds the predetermined threshold pressure, control of the fuel pressure in the high-pressure system not to exceed the threshold pressure, even if the discharge abnormality occurs before the abnormality handling stops the rise in the fuel pressure, wherein
   the control device is configured to perform the control of the fuel pressure not to exceed the threshold pressure by
      controlling a valve opening degree of the decompression mechanism based on a target valve opening degree to perform decompression, and
      controlling the booster pump based on a target discharge amount to increase the discharge flow amount as compared with a case in which the control device does not perform the control of the fuel pressure not to exceed the threshold pressure,
         to offset a fall in the fuel pressure in the high-pressure system due to the decompression and a rise in the fuel pressure in the high-pressure system due to increase in the discharge flow amount with each other, and
         to decrease, by the increase in the discharge flow amount to offset the fall in the fuel pressure in the high-pressure system, an increasable flow amount, which is a difference between the discharge flow amount and a maximum discharge flow amount of the booster pump, as compared with a case in which the control device does not perform the control of the fuel pressure not to exceed the threshold pressure.

2. The fuel pressure control system according to claim 1, wherein
   the control device includes a target fuel pressure calculator configured to calculate a target fuel pressure,
   the control device is configured to control the fuel pressure in the high-pressure system to approach the calculated target fuel pressure, and
   the control device is configured to perform the control of the fuel pressure not to exceed the threshold pressure by
      maintaining the target fuel pressure at a pressure same as a case when the control device does not perform the control of the fuel pressure not to exceed the threshold pressure, and
      causing the decompression mechanism to perform the decompression to cause the booster pump to increase the discharge flow amount as compared with a case in which the control device does not perform the control of the fuel pressure not to exceed the threshold pressure.

3. The fuel pressure control system according to claim 1, wherein
   the control device is configured to perform the control of the fuel pressure not to exceed the threshold pressure by
   increasing a fuel pressure margin, which is a difference between the fuel pressure in the high-pressure system and a threshold pressure, as compared with a case in which the control device does not perform the control of the fuel pressure not to exceed the threshold pressure.

4. The fuel pressure control system according to claim 3, wherein
   the control device includes a target fuel pressure calculator configured to calculate a target fuel pressure,
   the control device is configured to control the fuel pressure in the high-pressure system to approach the calculated target fuel pressure, and
   the control device is configured to perform the control of the fuel pressure not to exceed the threshold pressure by
      setting the target fuel pressure to a value that is lower than a case in which the control device does not perform the control of the fuel pressure not to exceed the threshold pressure and lowering the fuel pressure in the high-pressure system.

5. The fuel pressure control system according to claim 1, wherein the state determiner is configured to perform the state determination based at least on a rotation speed of the engine, and in the state determination, when the rotation speed of the engine is higher than a predetermined speed, the state determiner is configured more likely to make a determination of the warning-required state as compared with a case in which the rotation speed of the engine is the predetermined speed.

6. The fuel pressure control system according to claim 1, wherein the state determiner is configured to perform the state determination based at least on a discharge-related quantity, which is a discharge amount of the booster pump per combustion cycle or a fuel injection amount of the injector per combustion cycle, and in the state determination, when the discharge-related quantity is smaller than a predetermined amount, the state determiner is configured more likely to make a determination of the warning-required state as compared with a case in which the discharge-related quantity is the predetermined amount.

7. The fuel pressure control system according to claim 1, wherein the state determiner is configured to perform the state determination based at least on a temperature of a predetermined part, and in the state determination, when the temperature of the predetermined part is lower than a predetermined temperature, the state determiner is configured more likely to make a determination of the warning-required state as compared with a case in which the temperature of the predetermined part is the predetermined temperature.

8. The fuel pressure control system according to claim 1, wherein the control device is configured to maintain a same target fuel pressure as that in a normal control, in which the control device does not perform the control of the fuel pressure not to exceed the threshold pressure, by offsetting the fall in the fuel pressure in the high-pressure system due to the decompression and the rise in the fuel pressure in the high-pressure system due to increase in the discharge flow amount with each other.

9. The fuel pressure control system according to claim 1, wherein the control device includes a valve-opening necessity determiner configured to, on determination of the discharge abnormality, determine that valve opening of the decompression mechanism is necessary, a valve-opening degree calculator configured to calculate the target valve-opening degree on determination of the valve-opening necessity determiner that the valve opening of the decompression mechanism is necessary, and a discharge amount calculator configured to calculate the target discharge amount.

10. The fuel pressure control system according to claim 1, wherein the decompression mechanism is a solenoid valve or a butterfly valve that is configured to be opened or closed when energized.

11. A fuel pressure control system comprising:

a booster pump configured to discharge fuel to a high-pressure system to increase a fuel pressure in the high-pressure system, wherein the high-pressure system is a part of a fuel supply system that is to supply fuel to an injector of an engine;

a decompression mechanism configured to decompress the high-pressure system; and a controller configured to control the booster pump and the decompression mechanism to control a fuel pressure in the fuel supply system, wherein the fuel pressure control system is configured to, when a discharge abnormality occurs as an abnormality in which a discharge flow amount of the booster pump becomes larger than a normal amount to start rise in the fuel pressure in the high-pressure system, cause the decompression mechanism to perform a predetermined abnormality handling to stop the rise in the fuel pressure, and the controller is configured to perform a state determination to determine whether the fuel pressure in the high-pressure system possibly exceeds a predetermined threshold pressure, which is equal to or lower than a withstand pressure of the high-pressure system, if the discharge abnormality occurs before the abnormality handling stops the rise in the fuel pressure, start, on determination of the fuel pressure that possibly exceeds the predetermined threshold pressure, control of the fuel pressure in the high-pressure system not to exceed the threshold pressure, even if the discharge abnormality occurs before the abnormality handling stops the rise in the fuel pressure, wherein the controller is configured to perform the control of the fuel pressure not to exceed the threshold pressure by controlling a valve opening degree of the decompression mechanism based on a target valve opening degree to perform decompression, and controlling the booster pump based on a target discharge amount to increase the discharge flow amount as compared with a case in which the controller does not perform the control of the fuel pressure not to exceed the threshold pressure, to offset a fall in the fuel pressure in the high-pressure system due to the decompression and a rise in the fuel pressure in the high-pressure system due to increase in the discharge flow amount with each other, and to decrease, by the increase in the discharge flow amount to offset the fall in the fuel pressure in the high-pressure system, an increasable flow amount, which is a difference between the discharge flow amount and a maximum discharge flow amount of the booster pump, as compared with a case in which the controller does not perform the control of the fuel pressure not to exceed the threshold pressure.

* * * * *